(12) United States Patent
Redder et al.

(10) Patent No.: US 12,330,234 B2
(45) Date of Patent: Jun. 17, 2025

(54) METHOD AND APPARATUS FOR PROCESSING AN ELECTRICAL CONDUCTOR

(71) Applicant: Auto-Kabel Management GmbH, Hausen i.W. (DE)

(72) Inventors: Marie Redder, Wil (CH); Urszula Bitner, Berlin (DE); Kabelo Sebetlela, Berlin (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 18/563,656

(22) PCT Filed: Apr. 27, 2022

(86) PCT No.: PCT/EP2022/061192
§ 371 (c)(1),
(2) Date: Nov. 22, 2023

(87) PCT Pub. No.: WO2022/248149
PCT Pub. Date: Dec. 1, 2022

(65) Prior Publication Data
US 2024/0300051 A1    Sep. 12, 2024

(30) Foreign Application Priority Data
May 26, 2021 (DE) .............. 10 2021 113 513.3

(51) Int. Cl.
*B23K 26/26* (2014.01)
*B23K 26/361* (2014.01)
(Continued)

(52) U.S. Cl.
CPC ............ *B23K 26/26* (2013.01); *B23K 26/361* (2015.10); *B23K 26/38* (2013.01);
(Continued)

(58) Field of Classification Search
CPC ...... B23K 26/26; B23K 26/361; B23K 26/38; B23K 37/0435; B23K 2101/32; B23K 2101/38; H01R 43/0221; H01R 43/0263
(Continued)

(56) References Cited

U.S. PATENT DOCUMENTS 3,656,092 A  *  4/1972  Swengel, Sr. .......... H01R 4/723
                                                           439/730
4,224,499 A  *  9/1980  Jones .................... B23K 26/32
                                                           219/121.64

(Continued)

FOREIGN PATENT DOCUMENTS

DE   10 2013 008 497 A1    3/2014
JP        2005230318 A  *  9/2005  ............ A61M 25/00
JP        2007134307 A  *  5/2007

OTHER PUBLICATIONS

International Searching Authority/EP; International Search Report and Written Opinion of the International Searching Authority, Application No. PCT/EP2022/061192, dated Aug. 29, 2022; 11 pages.
(Continued)

*Primary Examiner* — Jimmy Chou
(74) *Attorney, Agent, or Firm* — Sunstein LLP

(57) ABSTRACT

Method for processing an electrical conductor, in which a bare conductor end of a stranded conductor is provided, the strands of the bare conductor end are gripped at least partially circumferentially by gripping jaws, the strands are
(Continued)

at least partially compacted in the region of the conductor end by the gripping jaws, and the compacted strands are welded to one another with the aid of a laser beam source in the region of the gripping jaws, through the gripping jaws.

26 Claims, 9 Drawing Sheets

(51) Int. Cl.
*B23K 26/38* (2014.01)
*B23K 37/04* (2006.01)
*H01R 43/02* (2006.01)
*B23K 101/32* (2006.01)
*B23K 101/38* (2006.01)

(52) U.S. Cl.
CPC ..... *B23K 37/0435* (2013.01); *H01R 43/0221* (2013.01); *H01R 43/0263* (2013.01); *B23K 2101/32* (2018.08); *B23K 2101/38* (2018.08)

(58) Field of Classification Search
USPC .................................................. 219/121.64
See application file for complete search history.

(56) References Cited

U.S. PATENT DOCUMENTS

| | | | | |
|---|---|---|---|---|
| 4,774,394 | A * | 9/1988 | Lemke | B23K 26/22 |
| | | | | 219/121.64 |
| 5,093,988 | A * | 3/1992 | Becker | H01H 1/5822 |
| | | | | 219/121.64 |
| 5,360,498 | A * | 11/1994 | Blomqvist | B29C 66/4312 |
| | | | | 156/580.2 |
| 6,498,319 | B1 * | 12/2002 | Matsumoto | H01L 21/481 |
| | | | | 219/121.72 |
| 9,728,927 | B2 * | 8/2017 | Kovacs | B23K 26/32 |
| 2003/0226823 | A1 * | 12/2003 | Fujimoto | H01R 43/0214 |
| | | | | 219/56.1 |
| 2010/0270275 | A1 * | 10/2010 | Nakamae | B23K 26/009 |
| | | | | 219/121.64 |
| 2011/0155701 | A1 * | 6/2011 | Gerst | B23K 20/10 |
| | | | | 219/78.01 |
| 2014/0353293 | A1 * | 12/2014 | Huonker | B23K 26/127 |
| | | | | 219/121.6 |

OTHER PUBLICATIONS

German Patent Office, Office Action, Application No. 10 2021 113 513.3, dated Jan. 7, 2022-, 4 pages (in German).

* cited by examiner

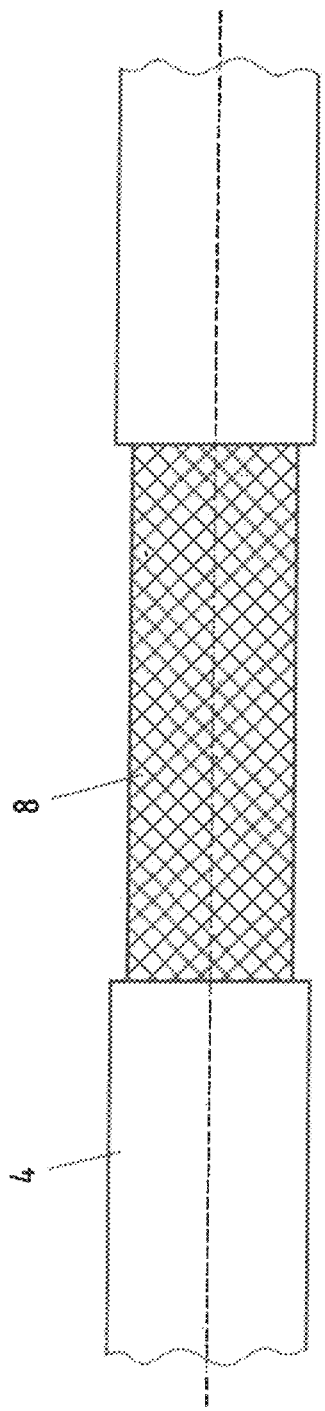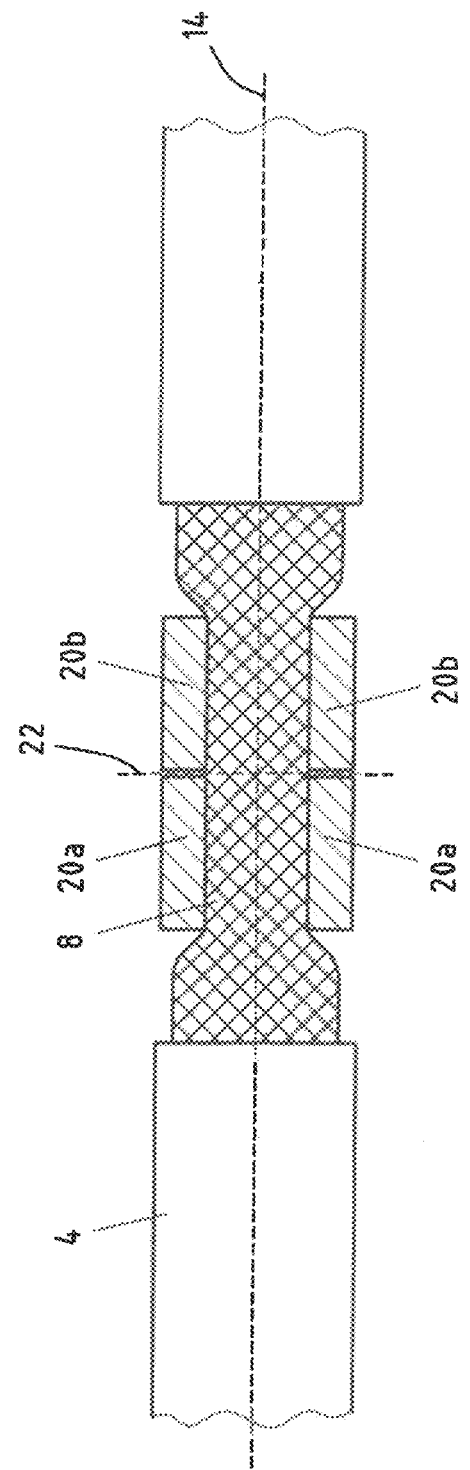

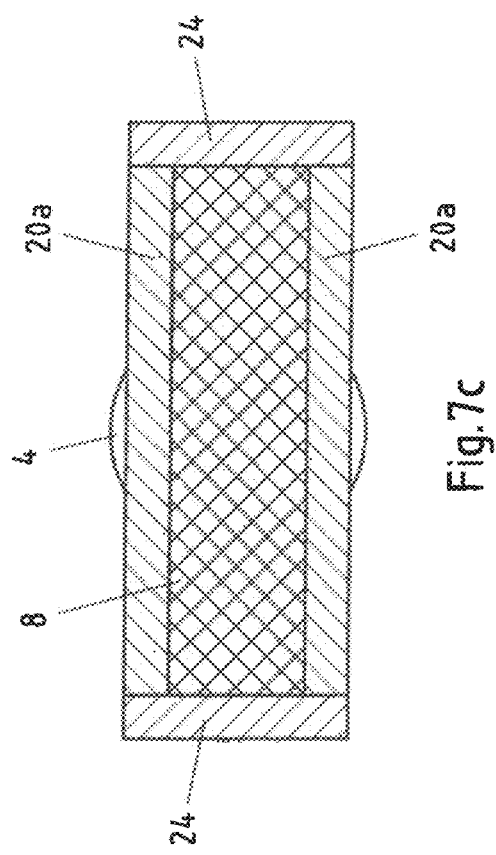
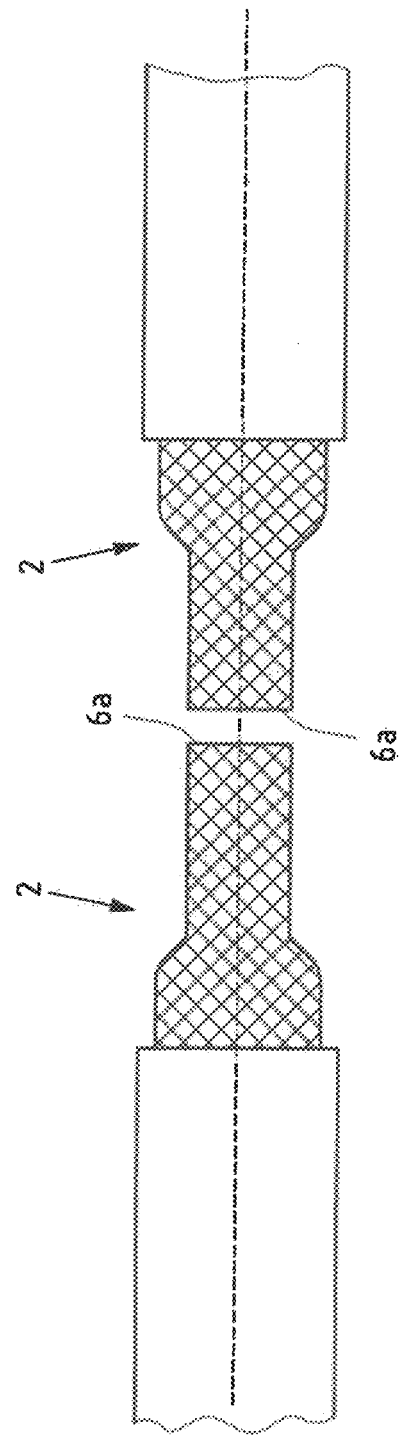

METHOD AND APPARATUS FOR PROCESSING AN ELECTRICAL CONDUCTOR

CROSS-REFERENCE TO RELATED APPLICATIONS

This application is the national phase entry of international patent application no. PCT/EP2022/061192, filed Apr. 27, 2022 and claims the benefit of German patent application No. 10 2021 113 513.3, filed May 26, 2021, the disclosures of which are incorporated herein by reference in their entirety.

TECHNICAL FIELD

The subject matter relates to a method and a processing device for electrical conductor. In particular, the subject matter relates to a method for processing a conductor end, in particular for preparing a conductor end for subsequent welding to a connecting part. Furthermore, the subject matter relates to a method for welding a conductor to a connecting part.

BACKGROUND ART

The welding of stranded conductors to connecting parts, for example flat parts, cable lugs, connecting sleeves or the like, is sufficiently known. The best-known welding processes include resistance welding, friction welding and laser welding. In laser welding in particular, the front face of the stranded conductor must be as flat as possible for butt welding of the conductor end to a connecting part.

A conductor which is to be welded within the meaning of this application is a stranded conductor. This is formed from a plurality of strands. The strands may be untwisted, twisted, rope layed, interwoven or otherwise arranged in an orderly or disorderly manner. In particular, a conductor braid of stranded wires can also be used. The stranded conductor may have a flat or round conductor cross-section.

In preparation for the welding process, a cable is preferably stripped at one end so that a bare conductor end is present. The cable can also be stripped in the middle so that the insulation of the cable is applied on both sides of the stripped areas. When the conductor is then cut in the stripped area, there is also a bare conductor end.

The stranded wire ends arranged in the stripped area must be brought into a desired cross-sectional profile for the subsequent welding process, especially for a butt joint. This profile is often congruent with the profile of the connecting part to be welded. In particular, this can be a polygonal, especially rectangular or square profile.

In conventional processes, the strands are compacted to each other at the conductor end, i.e. mechanically pressed together, so that gaps between the strands are reduced or eliminated. This process creates a disordered strand pattern at the front face to be welded, i.e. the individual strands protrude or recede to different extents from an imaginary end plane. This means that there is no flat front face that can be welded by laser welding.

In the case of a butt joint, the individual strands protruding to different extents result in only small, non-contiguous contact surfaces between the strand ends and the connecting part, since only some of the strands protrude sufficiently far to come into contact with the connecting part. Since only a few strands are in direct contact with the connecting part, there may be too little material to be welded to produce a continuously running weld seam during a subsequent laser welding process. In addition, direct contact only occurs between individual strands and the connecting part and the cross-sectional area of the weld seam is reduced and undefined compared to the cross-sectional area of the connecting part. On the one hand, this is disadvantageous with regard to the mechanical long-term stability of the connection, and on the other hand with regard to the electrical contact resistance. In particular, due to an increased electrical contact resistance, there are increased joule losses and thus increased heat input, which can ultimately lead to damage of the weld seam.

To produce a continuous laser weld seam with a sufficiently large joining surface, it is therefore necessary to deburr the front surface of the compacted strands using suitable manufacturing processes. Nowadays, this is done by milling, sawing or punching the already compacted strands at the conductor end so that a flat front face is formed. This flat front face provides a sufficiently large and reliable joining surface to enable welding to a connecting part.

A disadvantage of the known method is the multistep preparation of the conductor with various tools. The conductor must be provided bare, i.e. in the case of a cable, the conductor end must be stripped with a first tool. Then the strands must be compacted at one end with a second tool. Then, in a further processing step, the front face must be deburred with a third tool as described above to create a flat joining surface. These many steps with the various tools lead to considerable additional costs for a laser weld seam compared to, for example, a resistance weld seam.

The subject matter was now based on the task of preparing a conductor end for laser welding with as few work steps as possible.

SUMMARY OF THE INVENTION

It has been recognised that the laser beam source can be used to carry out both the step of compacting and the step of preparing the front face, so that two different tools do not have to process the conductor end, as has been the case up to now, but that the conductor end can be completely prepared for welding and, if necessary, also welded afterwards with a uniform tool.

It is therefore proposed to provide a bare conductor end of a stranded conductor. A conductor end is an area at a front face of the conductor. When the conductor is in a cable, the insulation at the cable end can be removed so that the bare conductor is present on the stripped cable.

It is further proposed that the strands of the bare conductor end are gripped at least partially circumferentially by gripping jaws. Gripping jaws can be moved relative to each other, towards each other and away from each other. Gripping jaws can be formed in the form of gripping arms, side sliders or the like. Gripping jaws can be multi-part, in particular two-, three-, four-part. The gripping jaws can be part of a gripping device. The gripping jaws can be part of a laser welding device, as will be shown below, and can be combined in a device together with a laser beam source, for example. The gripping jaws surround the conductor end at least partially, preferably completely. In doing so, the gripping jaws grip around the strands of a conductor end which has been provided bare in order to subsequently compact the strands. Preferably, all the strands of the conductor end are gripped by the gripping jaws. When gripping, the strands are preferably gripped in a ring shape.

The gripping jaws are then moved towards each other so that the strands between the gripping jaws are mechanically compressed in a radial direction. The strands are compressed so that gaps between the strands are reduced, minimised, in particular eliminated. The gripping jaws compact the embracing strands at least partially, whereby degrees of compaction of over 90% are possible. In the non-compacted state, there are gaps between the strands, which are filled with air, for example. Compacting moves the strands towards each other and reduces the gaps. The ratio between material of strands and material without strands can be understood as the degree of compaction. This is preferably above 90%, preferably above 95%.

As explained at the beginning, a laser beam source is provided for laser welding anyway. This laser beam source can now be used to weld the compacted strands together in the area of the gripping jaws through the gripping jaws. Thus, the laser beam source can already be used to at least partially join the compacted conductor ends together in a materially bonded manner. The strands can be at least partially melted by the laser beam source, through the gripping jaws, so that the strands are at least partially welded together at their surfaces. A welding node is thus formed while the strands are still pressed together by the gripping jaws. As the laser beam source welds the strands together through the gripping jaws, the strands are spatially fixed to each other by the gripping jaws, resulting in a flat weld pattern. The arrangement of the strands in relation to each other is fixed. When the gripping jaws are removed, this arrangement remains.

According to an embodiment, it is proposed that the gripping jaws, at least in welding areas, are formed from a material that is at least partially translucent for a laser beam emerging from the laser beam source. A welding region may be such a region in which the strands are welded while being gripped by the gripping jaws. The gripping jaws may be configured to be formed of a material translucent to the laser beam in at least the welding regions. The laser beam source can be adjusted to have a focal point on the strands behind the gripping jaws, ensuring that the necessary welding temperature is reached at the strands.

Through the gripping jaws, in particular through the translucent material, the strands are welded together and form a weld node which can subsequently be processed, as will be described below.

The term "through the gripping jaws" can also be understood to mean that window-like recesses are provided in the gripping jaws within the welding areas. These window-like recesses can be through recesses. The gripping jaws are then provided with recesses through which the laser beam of the laser beam source can impinge directly on the strands. This means that the laser beam does not have to pass through the material of the gripping jaws, but hits the strands directly. In both cases, a material bond is created between the strands in the welding area.

According to an embodiment, it is proposed that the gripping jaws embrace the conductor end at a front face. The front face is thus mechanically fixed by the gripping jaws and the laser beam of the laser beam source can at least partially weld the strands together through the gripping jaws, as described above. At the front face, the strands are fixed to each other due to the gripping jaws and a process-safe weld seam can be formed.

As already explained, the gripping jaws can grip around the strands. In this case, the gripping jaws can grip around the strands in a ring shape, preferably in a closed ring. The recesses or the translucent material can be arranged on the circumferential surface of the gripping jaws. The laser beam can impinge on the strands in a radial direction through the gripping jaws and at least partially weld them together. In particular, at least the peripheral strands, i.e. the strands lying on the outer lateral surface of the stranded conductor are welded together. However, it is also preferred that the strands lying further inwards can also be at least partially welded together due to the energy introduced by the laser beam. The strands can also be welded together at the front faces.

According to an embodiment, it is proposed that the strands are compacted into a polygonal, in particular rectangular, cross-sectional profile with the aid of the gripping jaws. The stranded conductor can also be a round conductor. With the aid of the gripping jaws, the cross-sectional profile of the stranded conductor can be changed in the area of the gripping jaws. In particular, a polygonal, preferably rectangular or square cross-sectional profile can be produced. It is preferable if the cross-sectional profile obtained by compacting is geometrically similar or congruent to the cross-sectional profile of the connecting part to be welded. In particular, in the case of a butt joint, the cross-sectional profiles of the abutting surfaces that are welded together may be geometrically similar or congruent to each other.

According to an embodiment, it is proposed that the compacted strands are welded together through the gripping jaws at opposing jaws of the gripping jaws by means of the laser beam source. As explained above, the laser beam may impinge on the strands in a radial direction. In order to achieve that the welding node is as compact as possible, it is proposed that not only on one side of the gripping jaws, but on opposite sides of the gripping jaws, the laser beam welds the strands through the gripping jaws. It is also preferred that a welding area is provided on each of the gripping jaws, so that the strands are at least partially welded together on all side surfaces of the compacted welding node.

According to an embodiment, it is proposed that at least two welding areas are arranged at the gripping jaws spaced apart from each other in the longitudinal direction of the stranded conductor. The conductor extends along a longitudinal axis and has a longitudinal direction. Starting from the front face, the conductor extends in the longitudinal direction. The welding areas on the gripping jaws can be provided spaced apart from each other in this longitudinal direction on a gripping jaw. At least two welding areas spaced apart from each other are proposed. The further welding areas provide an increased mechanical stability of the weld node after welding.

As already explained, the strands are to be compacted by the gripping jaws. This compacting can be optimised by vibrationally exciting the gripping jaws after the gripping, during the compacting. By vibrating the gripping jaws, especially with high-frequency vibrations, the loose connections between the strands, be it disordered, ordered, twisted or rope layed, can be broken up. The vibrations cause the strands to be brought into an optimised order relationship with each other, so that gaps between the strands are reduced, minimised or eliminated. The vibration excitation also causes the strands to deform plastically more easily, so that the compacted area of the strands is plastically deformed and a compacted node is formed, which is subsequently suitable for laser welding.

According to an embodiment, it is proposed that the compacted strands that are welded together are deburred on the front face after welding with the aid of a laser beam source. As explained above, due to the (e.g. loose, disordered, ordered, twisted or stranded) arrangement of the strands within the stranded conductor, it occurs that when these strands are compacted, their strand ends protrude differently from an imaginary front face. In order to achieve a flat front face, it is proposed to deburr the welded strands with the laser beam source. In this process, the laser of the laser beam source removes the material of the strands that protrudes beyond the imaginary front face and an actual front face is created at the imaginary front face. Laser deburring as such is known and is therefore not described in detail.

It is particularly advantageous if welding and deburring are carried out using the same laser beam source. As already explained at the beginning, it is particularly advantageous if compacting and deburring could take place in one and the same tool. For this purpose, one and the same laser beam source can be used. It is possible to refocus the laser beam of this laser beam source according to the respective requirements. Laser beam sources with more than one, preferably two or three focus points are known, which can be variably adjusted. It is thus conceivable that a first focal point is selected for welding the compacted strands and a second focal point is selected for subsequent deburring. One and the same laser beam source can thus be used for two different process steps, which is very advantageous for the process.

According to an embodiment, it is proposed that a front face of the stranded conductor has a evenness of at most 1 mm, preferably at most 0.5 mm, after deburring. The evenness is a measure of the deviation of a surface from a reference plane. The reference plane is preferably perpendicular to the longitudinal axis of the conductor. A maximum deviation of the front face from the reference plane is also 1 mm for a evenness of maximum 1 mm. The more even the front face, the easier it is to place it against the connecting part and butt weld it to it. In the butt joint in particular, the deburred front face is placed against the connecting part and then welded to the connecting part. The high evenness of the front face results in a large contact surface. On the one hand, this favours the welding process, as it is very uniform, and on the other hand, the welded surface is also sufficiently large to keep the transition resistance at the weld node as low as possible.

According to an embodiment, it is proposed that the strands are encompassed by a cutting device before compacting and are cut off substantially flat at a front face.

In addition to deburring, preferably laser deburring after compacting and welding, it is also possible that a flat front face is produced before the present welding. For this purpose, it is proposed that a conductor is bare in one area. For this purpose, a cable can be freed from insulation in an end region or a centre region, as previously described. The conductor is then gripped by gripping jaws. These can be gripping jaws of a cutting device or the gripping jaws mentioned above. The gripping jaws can be spaced apart from each other in the longitudinal direction, so that two adjacent areas with a gap are formed by the gripping jaws in the longitudinal direction of the conductor and cutting can be carried out along this gap. It is also possible that the gripping jaws grip around the conductor and a cut is made at one front face of the gripping jaws.

In both of the above cases, it is proposed that the individual strands are subjected to mechanical vibrations during the gripping. For this purpose, the cutting device is vibrationally excited, in particular with ultrasound, before the strands are cut, so that existing twists and entanglements of the individual strands are loosened and these are "jolted" into a new position. The behaviour of the strands during vibration excitation is preferably the same during cutting as well as during compacting, so that the respective descriptions can be used interchangeably.

The compressed, compacted strands are cut with a cutting device so that a flat cutting surface is created. The cutting is carried out in such a way that a substantially plane end surface with the above-mentioned evenness is produced.

The gripping jaws of the cutting device can, as it were, be gripping jaws of the welding device described above. After cutting, the above-described welding of the strands can take place immediately. It is also possible that the gripping jaws of the cutting device are released and the gripping jaws described above are applied. In this case, however, compacting is not absolutely necessary, as this can already have been done beforehand, as described.

Due to the unbraiding and untwisting of the strands before cutting, they are already in their final position and after cutting they no longer shift. This ensures that the flat front surface achieved by cutting is maintained after cutting. If the strands are welded together immediately or in close proximity to this, as described above, the position of the strands in relation to each other is fixed.

In other words, it is possible according to the subject matter to first provide a flat front face with a given evenness by means of a cutting device and then to weld the compacted strands of the conductor end and thus fix their position to each other. On the other hand, it is also possible to first compact and weld the strands and to fix their position relative to each other and then to produce a flat front face. In both cases, the strands are welded to each other through the gripping jaws in the manner described above.

According to an embodiment, it is proposed that the stranded conductor is a stranded braid or a multi-stranded conductor. A multi-strand conductor may be formed of ordered, disordered, twisted, braided or stranded strands, as described above.

According to an embodiment, it is proposed that after welding, the stranded conductor is butt welded to a connector with its welded conductor end using a laser beam source. As already explained above, the end surface of the stranded conductor is flat due to the cutting and subsequent welding or the welding and subsequent deburring. This flat front face is used to enable welding to a connecting part in a butt joint. The flat front face is pressed against the connecting part and then welded with a laser beam source.

Preferably, the same laser beam source is used that was previously used at least for welding, but preferably also for deburring. Here, the laser beam source can be multifocal, as already explained above. This means that the laser beam source has a laser that can be adjusted for different applications with different focal points. Thus, a different focal point can be selected for welding than for the previous welding and/or deburring. However, it is advantageous to use exactly the same laser that was previously used for welding and, if necessary, deburring. Thus, the complete welding process including preparation of the stranded conductor can be carried out in one tool.

According to an embodiment, it is proposed that the laser beam source is adjusted multifocally. In this context, it should be mentioned again that the welding of the stranded conductors can be performed with a different focus than the optional deburring and the optional butt welding with the connecting part. Different settings on the same laser beam source allow it to be used for the different applications mentioned, thus enabling welding in the same tool.

In another aspect, a processing device has a providing means for providing a bare conductor or a bare conductor end. The bare conductor end can then be gripped by gripping jaws. In this case, an at least partial, preferably completely circumferential gripping is proposed. With the help of the gripping jaws, the strands can be at least partially compacted. The compacted strands are then welded together by means of a laser of a laser beam source, so that a compact weld node is formed. During welding, the laser of the laser beam source is directed through the material of the gripping jaws or through recesses in the gripping jaws onto the strands.

BRIEF DESCRIPTION OF THE DRAWINGS

The subject matter is explained in more detail below with reference to a drawing showing embodiments. The drawings show:

FIG. 7a-d a cutting of a stranded conductor before welding according to an embodiment;

DETAILED DESCRIPTION OF SPECIFIC EMBODIMENTS

Figure 1A:
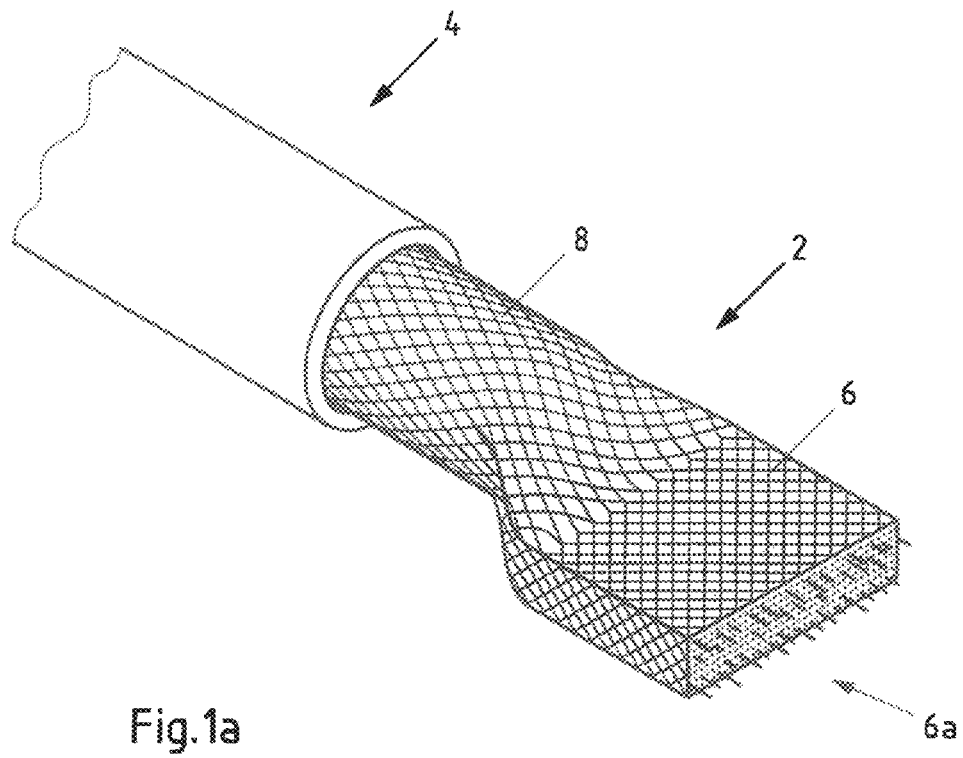
FIG. 1a, b a conductor end with strands according to the prior art in the unprocessed state.

FIG. 1a shows a view of a conductor end 2 of a cable 4. The conductor end 2 has a compacted region 6. In the compacted region 6, the strands 8 of the conductor end 2 are compacted, in particular in such a way that a cross-sectional profile of the conductor end 2 is rectangular. The compacted area 6 has been produced in particular by resistance welding.

Figure 1B:
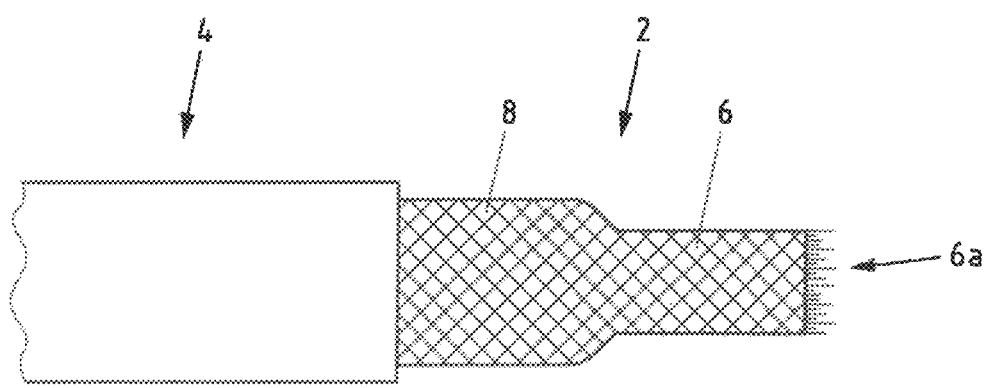
Figure 8:
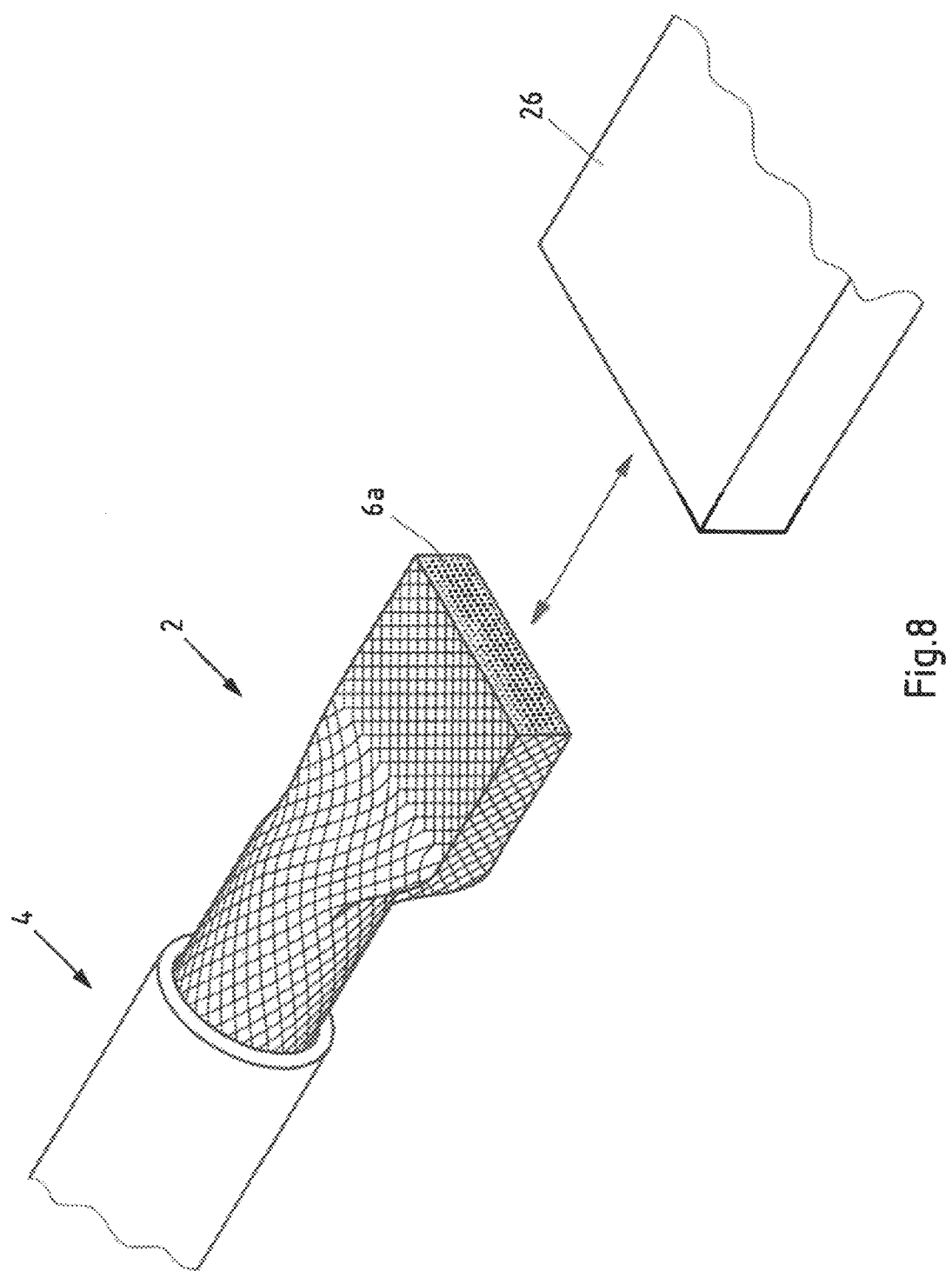
FIG. 8 a butt welding of a stranded conductor to a connecting part according to an embodiment.

In FIG. 1b, it can be seen that a front face 6a of the compacted region 6 is formed by strand ends of the strands 8 protruding less and further. The evenness of the front face 8 is 2 to 3 mm. This is not suitable for subsequent butt welding as shown in FIG. 8.

The uneven face 6a is caused by the strands being moved towards each other during compacting of the compacted area 6. Due to the structure of the conductor end 2, the strands 8 are usually twisted, rope layed or interwoven in some other way. Compacting changes this structure so that the positional relationship of the strands 8 to each other is altered. This results in the strands 8 protruding further and less far from the front face 6a.

Figure 2A:
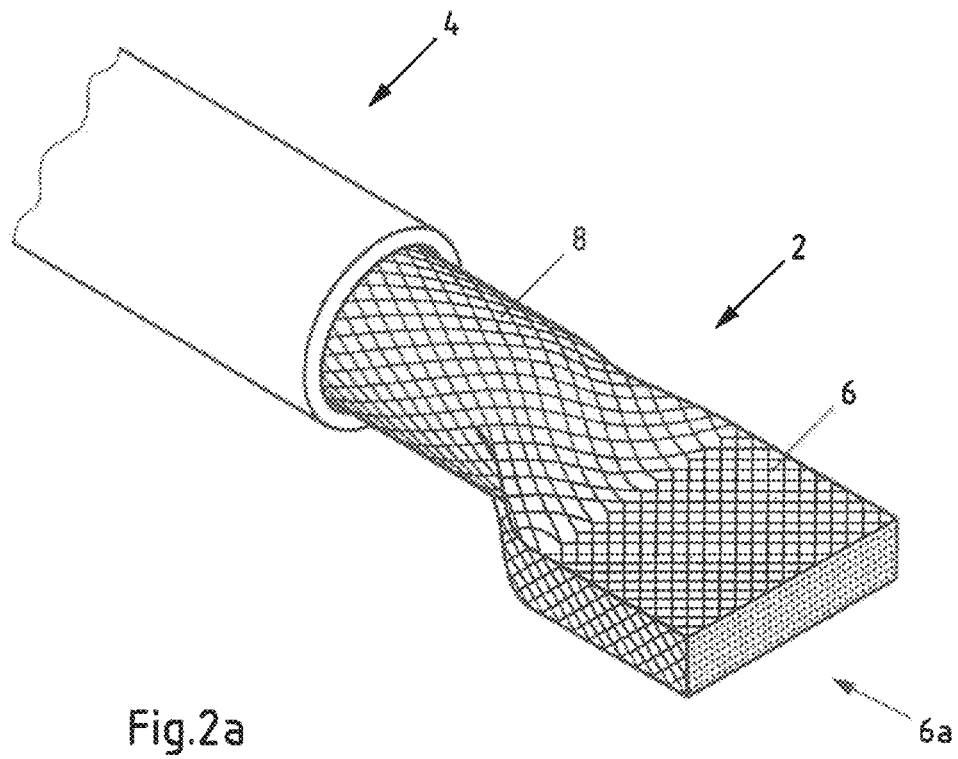
FIG. 2a, b a conductor end of a stranded conductor in the processed state according to the state of the art.
Figure 2B:
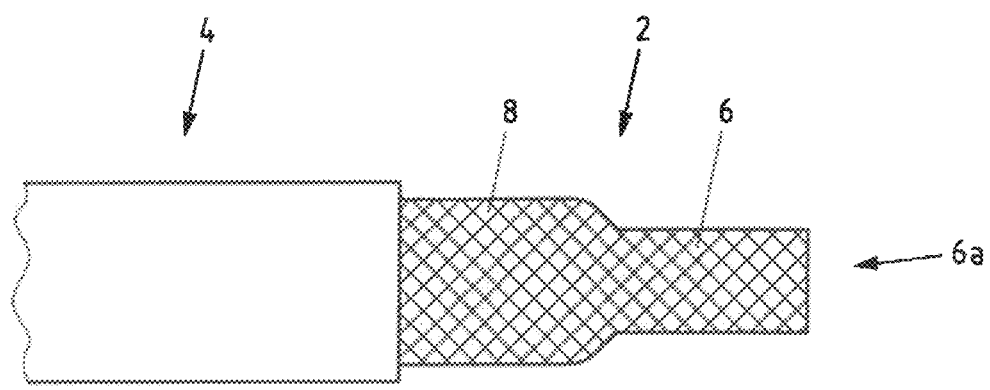

In order to prepare the front face 6a for welding, the front face 6a is reworked after resistance spot welding, in particular by cutting or milling, as shown in FIG. 2a. As can be seen in FIG. 2b, this achieves an evenness of the front face 6a of 0.5 mm or less. Such a front face 6a is suitable for subsequent butt welding. In the known processes, however, a wide variety of tools are required to prepare the front face 6a in the manner shown.

Figure 3A:
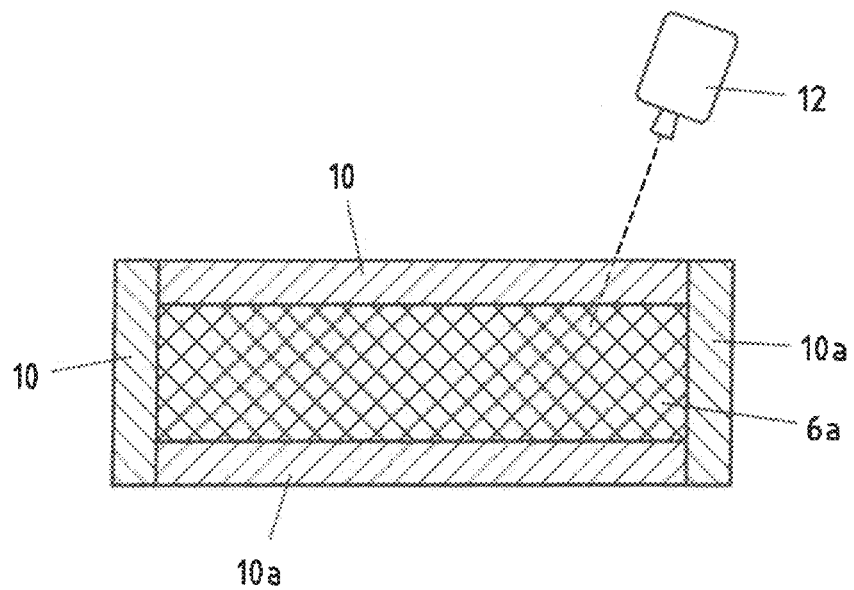
FIG. 3a, b the processing of a stranded conductor according to an embodiment.

According to the invention, it is now proposed to prepare the conductor end 2 by means of laser welding, as shown in FIG. 3a, b.

FIG. 3a shows a top view of a front face 6a of a conductor end 2. On the perimetral side of the conductor end 2, gripping jaws 10 are moved towards each other in a radial direction towards the centre of the conductor end 2, thus compacting the conductor end 2. A compacted area 6 is formed. In this process, the gripping jaws 10 can be excited by vibration, in particular by ultrasonic vibration, in order, on the one hand, to move the strands 8 of the conductor towards each other and thus to dissolve their spatial arrangement relative to each other and, on the other hand, to facilitate plastic deformation of the strands 8 relative to each other. The gripping jaws 10 are shaped relative to one another in such a way that the front face 6a preferably has a rectangular cross-sectional profile, as shown. Other shapes are conceivable and are encompassed.

After compacting by the gripping jaws 10, a welding of the strands 8 to each other is effected by means of a laser beam 12, from a laser beam source not shown. In this process, the laser beam 12 penetrates the gripping jaws 10 and thus directly impinges on the circumferential strands 8 in the region of the front face 6, in particular in the compacted region 6. The strands 8 are welded together.

Figure 3B:
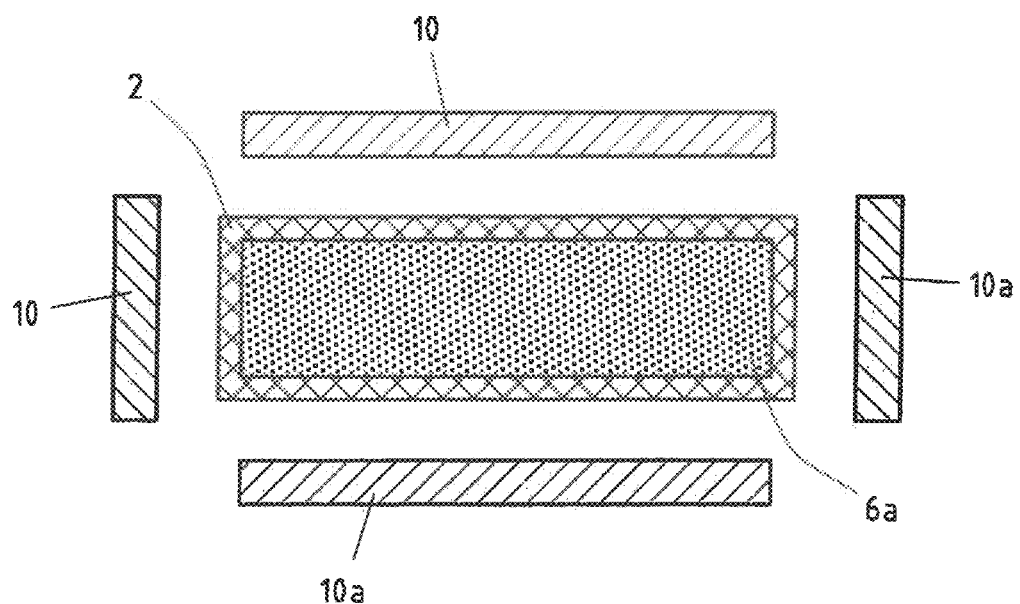

After welding, the gripping jaws 10 are moved apart in a radial direction away from the centre of the conductor end 2, as shown in FIG. 3b. It can be seen that the front face 6a has a reduced cross-sectional profile compared to the conductor end 2. The strands 8 are welded together in the compacted area 6, in particular at the front face 6a.

Figure 4A:
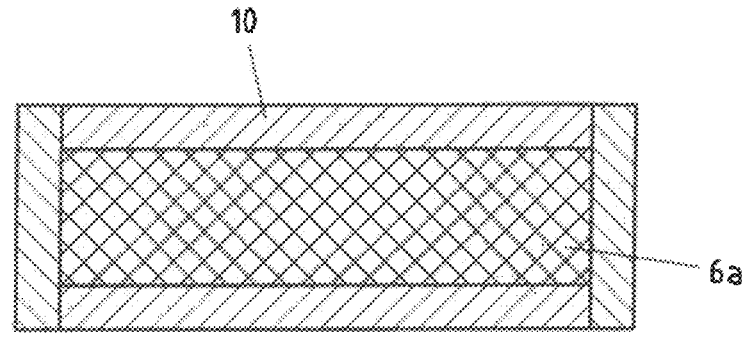
FIG. 4a-c the processing of a stranded conductor according to a further embodiment.
Figure 4B:
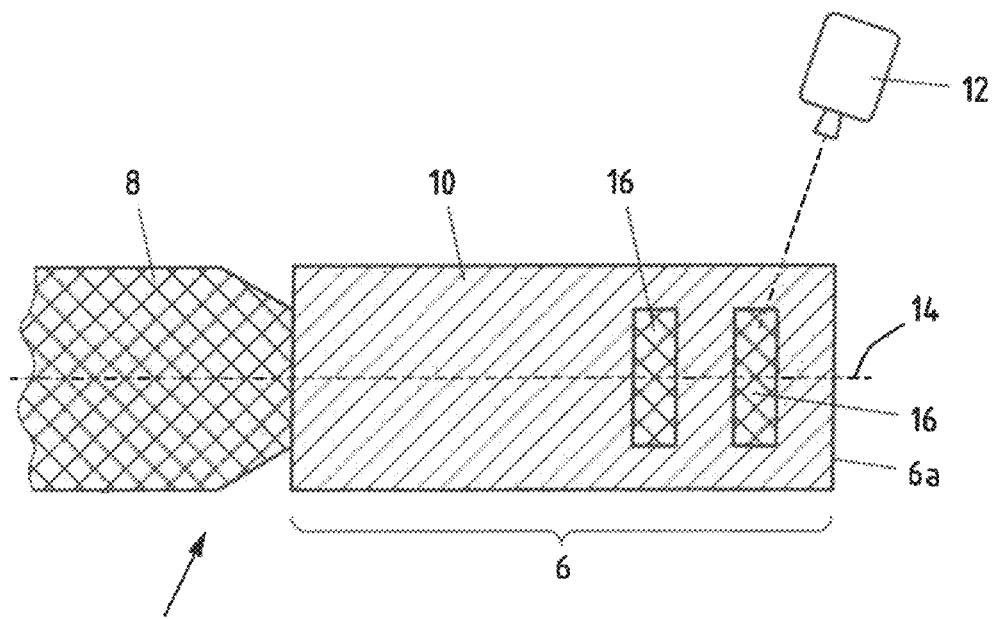
Figure 4C:
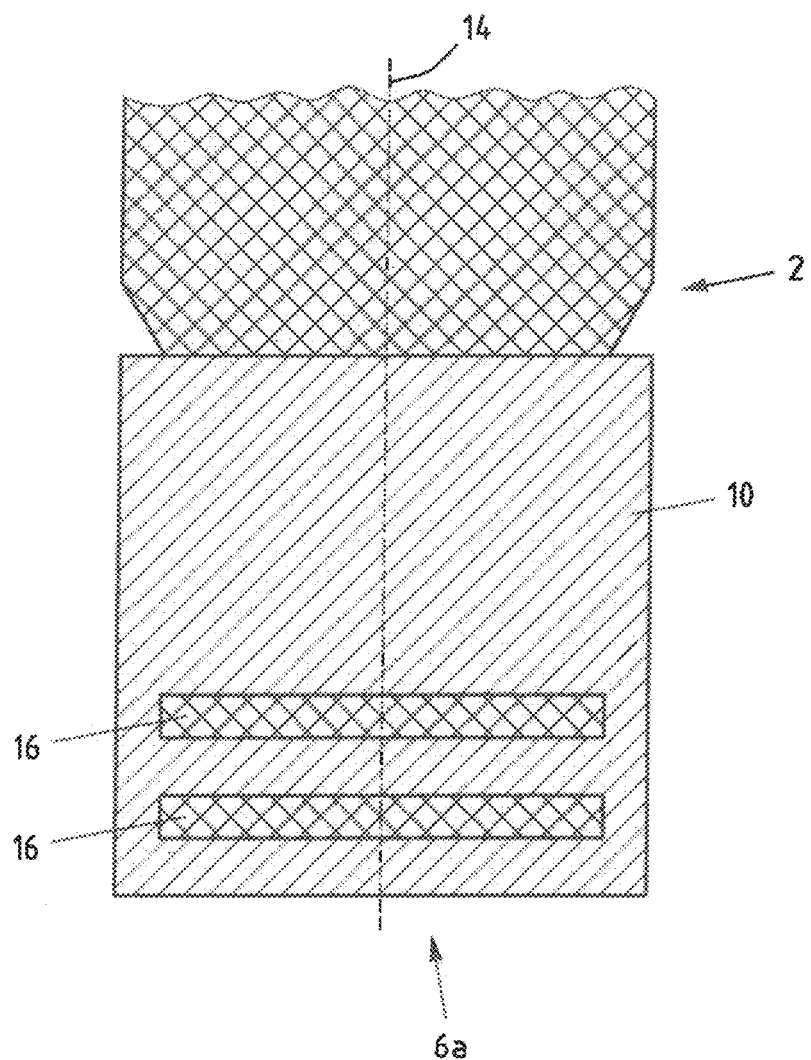

In a preferred embodiment, the welding of the strands 8 to one another through the gripping jaws 10 is shown again in FIGS. 4a-c. FIG. 4a shows the gripping jaws 10 and the front face 6a as in FIG. 3a.

In a top view, which is shown in FIG. 4b, it can be seen that at one conductor end 2 in a compacted area 6, the gripping jaws 10 rest on the strands 8. The cable 4 or conductor 2 extends in a longitudinal direction 14. Starting from a front face 6a spaced apart from the front face 6a in the longitudinal direction 14, welding regions 16 may be provided in the gripping jaws 10. It is possible that one or more welding regions 16 are provided in the gripping jaws 10 spaced apart from each other in the longitudinal direction 14. The laser beam 12 penetrates the gripping jaws 10 in the welding areas 16 and directly impinges on the strands 8 of the conductor end 2.

The welding areas 16 can be formed by recesses in the material of the gripping jaws 10. It is also possible that the welding areas 16 are formed by a translucent material through which the laser beam 12 can pass.

FIG. 4b shows a side view and FIG. 4c shows a top view of a conductor end 2. In FIG. 4c, corresponding to FIG. 4b, it can be seen in a top view that welding areas 16 are provided at a front face of the conductor end 2 in the gripping jaws 10. One or more welding areas 16 may also be provided in the top view. The arrangement of the welding areas 16 relative to the longitudinal direction 14 may be spaced apart.

It can be seen that welding areas 16 are provided both in a side view and in a top view. This preferably applies to both side views, as well as to a top view and a bottom view, so that the welding areas 16 preferably lie circumferentially, but not necessarily closed circumferentially, against the strands 8 of the conductor end 2 in the compacted area 6.

Figure 5:
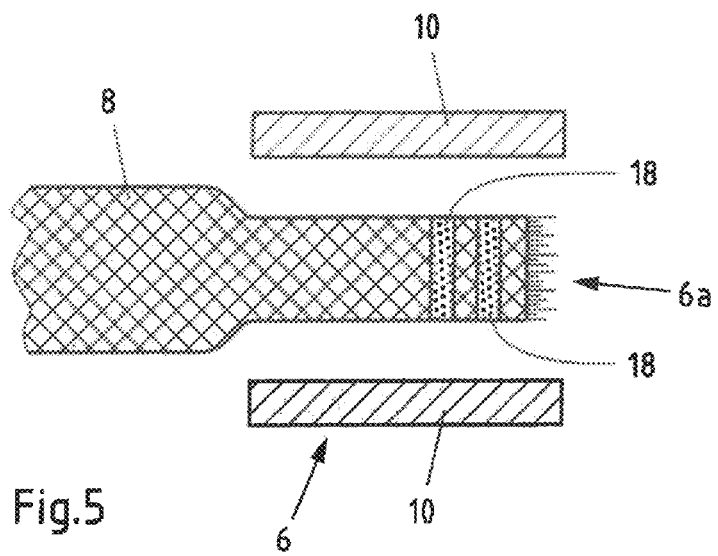
FIG. 5 a view of a processed stranded conductor according to an embodiment.

After welding by means of the laser beam 12, the gripping jaws 10 can be removed from the strands 8 in the compacted area 6, as shown in FIG. 5. It can be seen that in the welding areas 16 the strands 8 are welded together and welding nodes 18 are formed. Even with this compacting and welding, the front face 6a is still not flat to be butt welded.

Figure 6A:
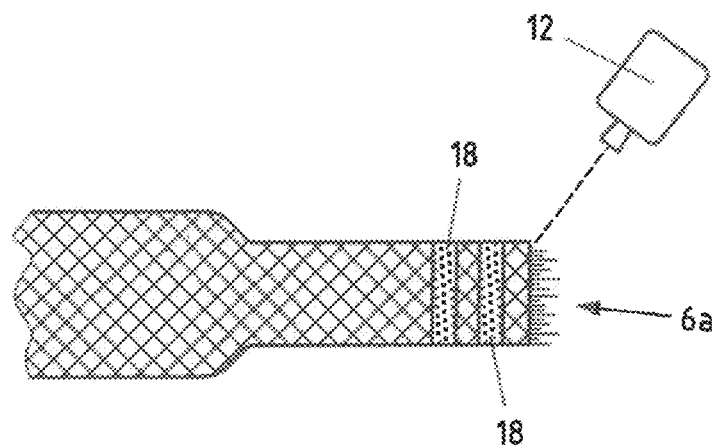
FIG. 6a, b a deburring of a stranded conductor after welding according to an embodiment.
Figure 6B:
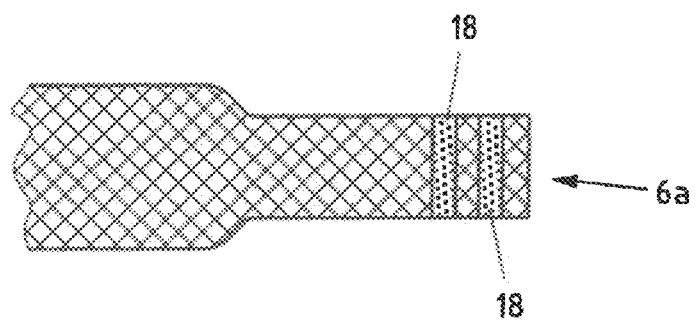

According to the subject matter, it is now proposed that, as shown in FIG. 6a, preferably the same laser beam 12 is used to remove the strands 8 from the front face 6. This laser deburring results in the front face 6*a*, as shown in FIG. 6*b*, having a evenness of less than 1 mm, preferably less than 0.5 mm. This front face 6*a* is suitable for butt welding to a connecting part as shown in FIG. 8.

Alternatively to the laser deburring according to FIG. 6*a*, *b*, a cutting process is also conceivable. Such a cutting process is shown in FIG. 7*a-d*. Preferably, the cutting process is carried out before welding as shown in FIGS. 3 and 4.

As can be seen in FIG. 7*a*, the cable 4 is stripped either in a central area or at the end so that the bare strands 8 are present. Pressing jaws 20*a, b* are applied to these bare strands 8. The pressing jaws 20*a, b* are spaced apart from each other in the longitudinal direction 14. This can be a gap 22 through which a cutting edge can run. This can be done by means of a knife, a laser or any other cutting method.

FIG. 7*c* shows the pressing jaws 20*a* in a cross-section perpendicular to the longitudinal direction 14. The pressing jaws 20*a* are pressed onto each other and the strands 8 are fixed to each other by side sliders 24. The strands fixed in this way can be cut with a cutting device so that, as shown in FIG. 7*d*, at least one, preferably two flat front faces 6*a* are formed. The procedure according to FIGS. 3 and 4 can then be carried out on this conductor end 2.

The conductor end 2 of the cable 4 is then butt welded with its front face 6*a* to a connecting part 26, as shown in FIG. 8. This butt welding is also carried out by means of the laser beam 12. The conductor end 6 is placed butt-welded on a surface of a connecting part 26. The laser beam 12 then travels along the interface between the front face 6*a* and the surface of the connecting part 26. Because the front face 6*a* has the evenness described, the laser beam 12 has a sufficiently large area of contact to weld the strands 8 almost completely to the surface of the connecting part 26.

A single laser beam source can be used for welding the strands together in the compacted area 6, for laser deburring according to FIG. 6, as well as for welding according to FIG. 8. This can be multifocal so that the appropriate focus can be set for the respective application.

LIST OF REFERENCE SIGNS

2 conductor end
4 cable
6 compacted area
6*a* front face
8 strands
10 gripping jaws
12 laser beam
14 longitudinal direction
16 welding area
18 welding nodes
20*a,b* pressing jaws
22 gap
24 side slider
26 connecting part

What is claimed is:

1. A method of processing an electrical conductor comprising:
    providing a bare conductor end of a stranded conductor;
    gripping the strands of the bare conductor end at least partially circumferentially with gripping jaws;
    at least partially compacting the strands in the region of the conductor end with the gripping jaws;
    welding together the compacted strands with the aid of laser from a laser beam source in the region of the gripping jaws, through the gripping jaws; and
    after the welding, deburring the compacted strands welded to one another on a front face, wherein the gripping jaws are vibrationally excited after gripping.

2. The method of claim 1, wherein the gripping jaws are formed, at least in welding regions, from a material which is at least partially translucent for a laser beam emerging from the laser beam source, and the compacted strands are welded to one another in the welding regions through the gripping jaws.

3. The method of claim 1, wherein the gripping jaws have through recesses at least in welding regions and the compacted strands are welded to one another in the welding regions through the gripping jaws.

4. The method of claim 1, wherein the gripping jaws grip around the conductor end at the front face.

5. The method of claim 1, wherein the compacted strands are welded together by means of the laser beam source at a perimeter of the gripping jaws, through the gripping jaws.

6. The method of claim 1, wherein the strands are compacted with the aid of the gripping jaws to form a cross-sectional profile being one of
    a) a polygon, and
    b) a rectangle.

7. The method of claim 1, wherein the compacted strands are welded together with the aid of the laser beam source at mutually opposite jaws of the gripping jaws, through the gripping jaws.

8. The method of claim 2, wherein at least two welding regions are arranged in the gripping jaws spaced apart from one another in the longitudinal direction of the stranded conductor.

9. The method of claim 1, wherein the welding of the strands and the deburring are carried out with the aid of the same laser beam source.

10. The method of claim 1, wherein the front face of the stranded conductor after deburring has an evenness of at most 0.5 mm.

11. The method of claim 1, wherein the stranded conductors are embracingly held prior to compacting and are cut off flat at the front face.

12. The method of claim 11, wherein the strands are vibrationally excited prior to cutting and are thereby at least partially untwisted relative to one another.

13. The method of claim 1, wherein the stranded conductor is a stranded braid or a multi-stranded conductor.

14. The method of claim 1, wherein, after the deburring, the stranded conductor is butt-welded with its welded conductor end to a connecting part by means of a laser beam source.

15. The method of claim 14, wherein the welding of the stranded conductors and the butt welding to the connecting part are carried out with the aid of the same laser beam source.

16. The method of claim 14, wherein the laser beam source is adjusted multifocally in such a way that a focus of the laser beam source is adjusted differently from each other during the welding of the strands, during the deburring and during the butt welding to the connecting part.

17. A method of processing an electrical conductor comprising:
    providing a bare conductor end of a stranded conductor;
    gripping the strands of the bare conductor end at least partially circumferentially with gripping jaws;
    at least partially compacting the strands in the region of the conductor end with the gripping jaws;

welding together the compacted strands with the aid of laser from a laser beam source in the region of the gripping jaws, through the gripping jaws; and after the welding, deburring the compacted strands welded to one another on a front face, wherein the stranded conductors are embracingly held prior to compacting and are cut off flat at the front face.

18. The method of claim 17, wherein the strands are vibrationally excited prior to cutting and are thereby at least partially untwisted relative to one another.

19. The method of claim 17, wherein, after the deburring, the stranded conductor is butt-welded with its welded conductor end to a connecting part by means of a laser beam source.

20. The method of claim 19, wherein the welding of the stranded conductors and the butt welding to the connecting part are carried out with the aid of the same laser beam source.

21. The method of claim 19, wherein the laser beam source is adjusted multifocally in such a way that a focus of the laser beam source is adjusted differently from each other during the welding of the strands, during the deburring and during the butt welding to the connecting part.

22. A method of processing an electrical conductor comprising:

providing a bare conductor end of a stranded conductor;

gripping the strands of the bare conductor end at least partially circumferentially with gripping jaws;

at least partially compacting the strands in the region of the conductor end with the gripping jaws;

welding together the compacted strands with the aid of laser from a laser beam source in the region of the gripping jaws, through the gripping jaws; and after the welding, deburring the compacted strands welded to one another on a front face, wherein, after the deburring, the stranded conductor is butt-welded with its welded conductor end to a connecting part by means of a laser beam source.

23. The method of claim 22, wherein the stranded conductors are embracingly held prior to compacting and are cut off flat at the front face.

24. The method of claim 23, wherein the strands are vibrationally excited prior to cutting and are thereby at least partially untwisted relative to one another.

25. The method of claim 22, wherein the welding of the stranded conductors and the butt welding to the connecting part are carried out with the aid of the same laser beam source.

26. The method of claim 22, wherein the laser beam source is adjusted multifocally in such a way that a focus of the laser beam source is adjusted differently from each other during the welding of the strands, during the deburring and during the butt welding to the connecting part.

* * * * *